April 15, 1969  S. GORLIN  3,438,383
AUTOMATIC WATERING DEVICE FOR PLANTS AND THE LIKE
Filed May 6, 1968  Sheet 2 of 3

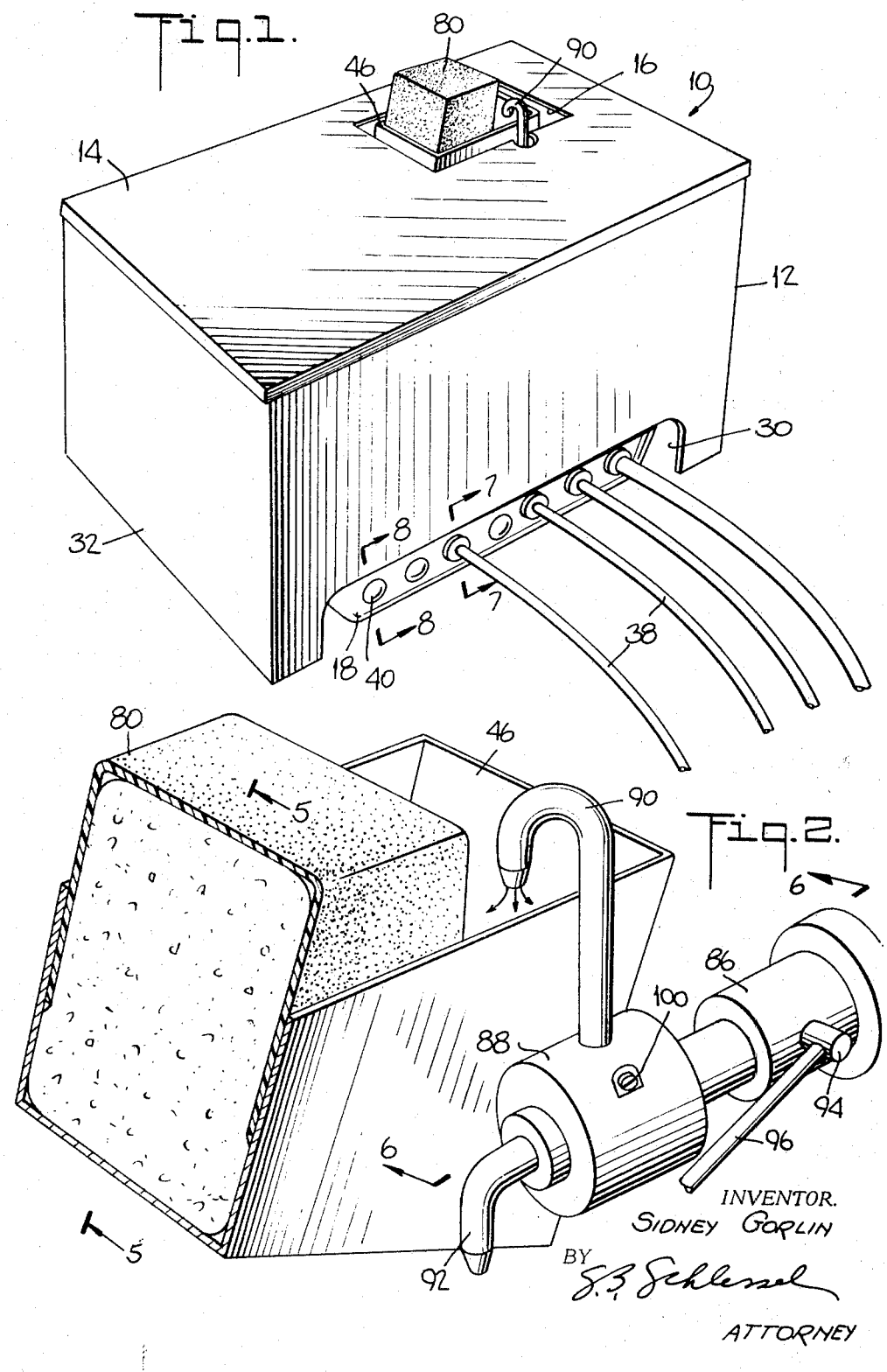

INVENTOR.
SIDNEY GORLIN
BY
ATTORNEY

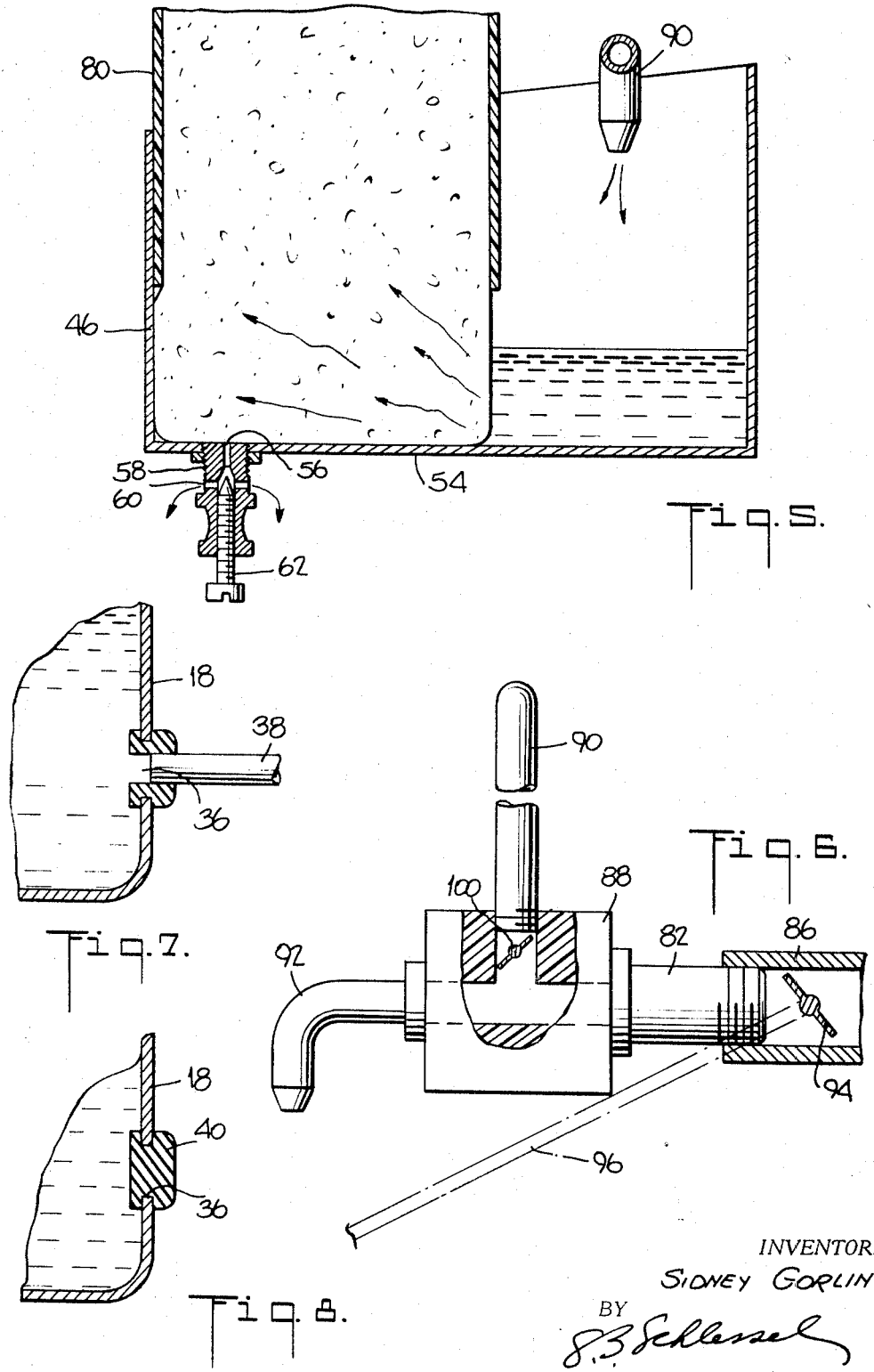

United States Patent Office 3,438,383
Patented Apr. 15, 1969

3,438,383
AUTOMATIC WATERING DEVICE FOR
PLANTS AND THE LIKE
Sidney Gorlin, 598 9th Ave., New York, N.Y. 10036
Filed May 6, 1968, Ser. No. 726,702
Int. Cl. F16k 21/18; E03b 11/00; F17d 1/00
U.S. Cl. 137—78                                    7 Claims

ABSTRACT OF THE DISCLOSURE

An apparatus for the automatic watering of plants, based upon natural atmospheric moisture conditions, whereby the natural absorption of water from a sponge material disposed in a pivotal chamber causes the chamber to pivot, thereby releasing a predetermined quantity of water from a water tank through tubes to the areas to be watered, the emptying of the tank causing refilling of the chamber and rewetting of the sponge material automatically from an available water supply, and the refilling of the tank to a predetermined level.

---

This invention relates generally to systems for automatic and periodic replenishment of water to plants and the like, and has for its specific objective the creation of a watering device, coupled to an available water supply, which is sensitive to the amount of moisture in the surrounding atmosphere and the prevailing extent of evaporation therein, so that the natural tendency toward evaporation in a specific area is utilized to activate the device and thereby cause a flow of water to the soil area in sufficient quantity to replenish its water supply. The device is selectively adapted to discontinue the flow of water when an adequate supply has been delivered and, intermittently and automatically, to repeat the process whenever natural absorption and evaporation again so requires. The basic concept of the invention thus lies in utilizing the natural evaporation of water as a guide to determine the need for replenishment, and then automatically furnishing such replenishment. Thus, in a dry region the replenishment of the water supply will be more frequent than in a wet region.

The device is particularly suited to water a plurality of potted plants and flowers disposed in rows or tiers within a greenhouse, but is equally adaptable for use out-of-doors.

In the present state of the art there are a number of automatic watering devices used for the intermittent watering of plants, flowers and the like. Most of these devices are provided with electrically-controlled timers which serve to activate the flow of water at designated time intervals, or by water capacity measurement. Since the need for water replenishment is determined by the rate of evaporation rather than lapse of time, these devices are not particularly effective. Other devices presently known utilize the natural evaporative tendencies of the atmosphere to activate an electric circuit for the release of water for replenishment. The dependency on such electrical circuitry generally renders the devices less effectual than when a source of electrical current is not required, or where it is not available.

It is therefore the principal object of my invention to provide an automatic plant-watering device which functions, automatically and mechanically, when the need arises to water plants and the like.

A second important object of my invention lies in the provision of an automatic watering device which can be adapted for adjustment to deliver selected amounts of water to plants in accordance with their requirements.

A third important object of my invention lies in the provision of an auomatic watering device which automatically replenishes its water supply, for availability when required or desired.

A fourth important object of my invention lies in the provision of an automatic watering device which can furnish regular supplies of water to any selected number of plants and the like.

Still another object of my invention lies in the provision of an automatic watering device which can be utilized both indoors and outdoors.

These and other salient objects, advantages and functional features of my invention, together with the novel features of construction, composition and arrangement of parts, will be more readily apparent from an examination of the following description of a preferred embodiment, taken with the accompanying drawings, wherein:

FIG. 1 is a top perspective view of a preferred embodiment of my invention;

FIG. 2 is an enlarged, top perspective view of the elements which control the water supply;

FIG. 5 is a cross-sectional view taken on line 5—5 of FIG. 2;

FIG. 6 is a cross-sectional view taken on lines 6—6 of FIG. 5;

FIG. 7 is an enlarged cross-sectional view taken on lines 7—7 of FIG. 1; and

FIG. 8 is an enlarged cross-sectional view taken on lines 8—8 of FIG. 1.

Similar reference characters designate similar parts throughout the different views.

Figure 3:
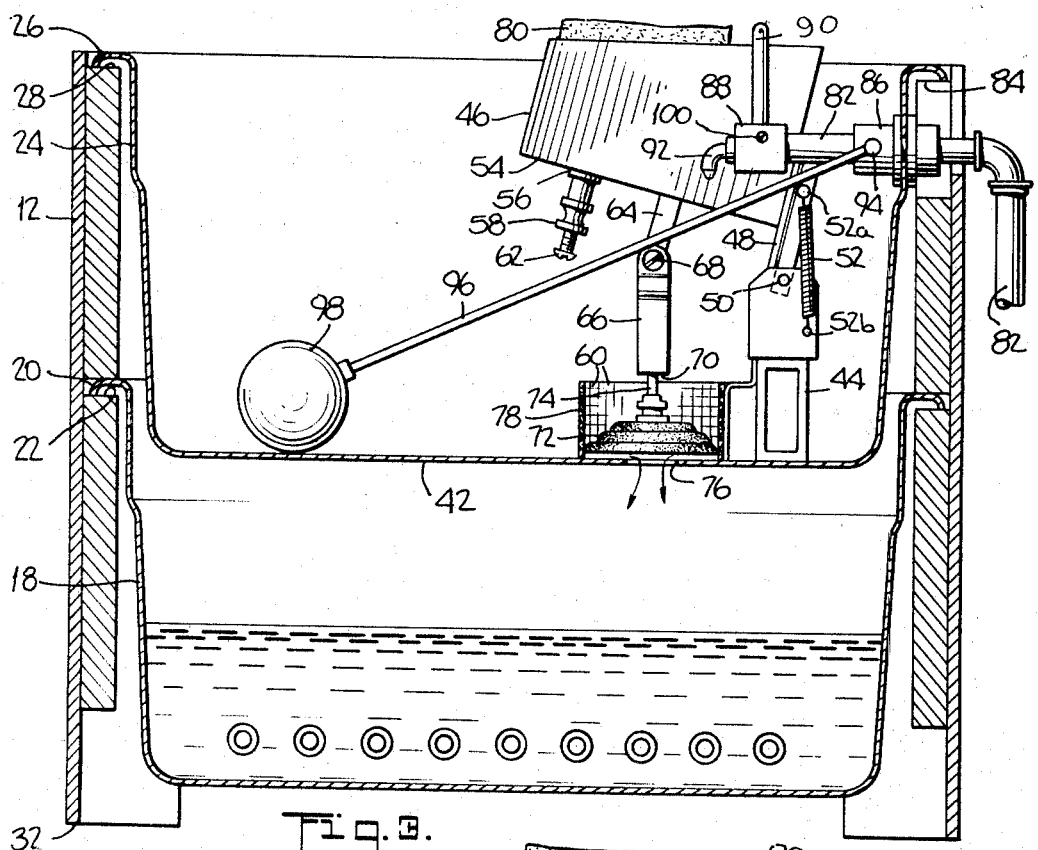
FIG. 3 is an enlarged cross-sectional view of the embodiment of FIG. 1, showing the device in position to receive a further water supply from an available water source.
Figure 4:
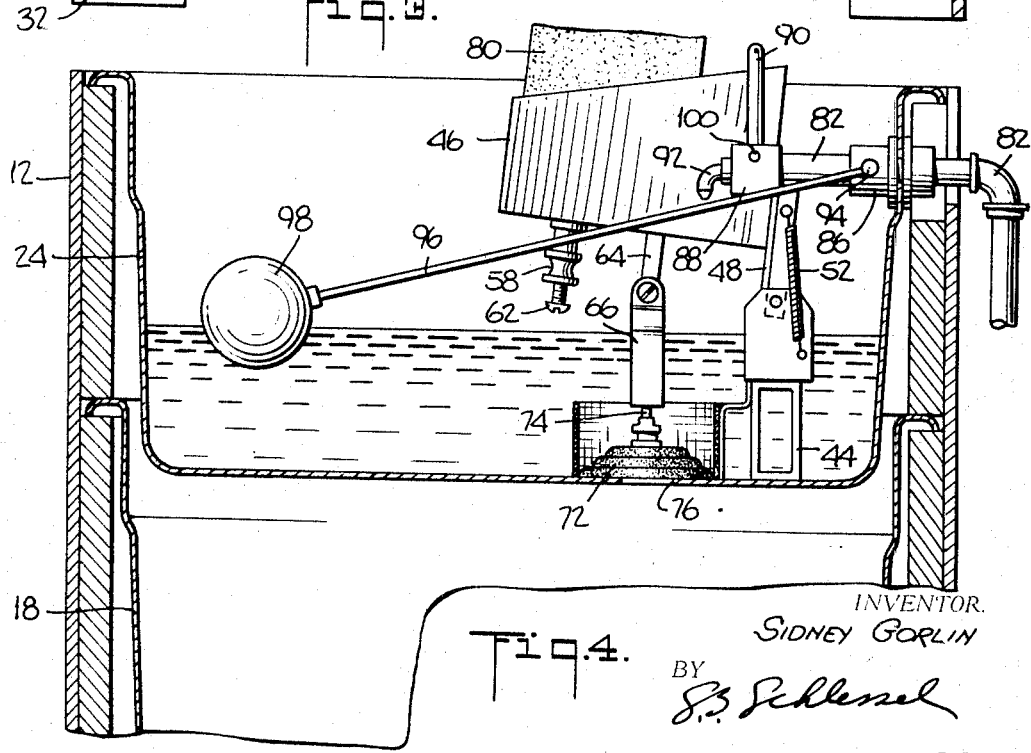
FIG. 4 is a view similar to FIG. 3, showing the device refilled with water, for further use.

Referring now to the drawings, my automatic watering device 10 comprises a housing 12 provided with a cover 14 having an aperture 16 through which an inner portion of the device 10 protrudes. As shown by FIGS. 3 and 4, the housing 12 contains a lower tank 18, supported therein by a flange 20 secured in a groove 22 in the inner wall of the housing 12, and, superposed thereover, an upper tank 24, supported in such position by means of a flange 26 secured similarly in a groove 28 in the inner wall of the housing 12.

The housing 12 has a cutout 30 along one side of its base 32, exposing one side 34 of the tank 18. The exposed side wall 34 of the tank 18 is provided, near its base, with a plurality of apertures 36, disposed so that water deposited in the tank 18 will flow out uniformly and evenly through each of the apertures 36 which are not otherwise closed off. As shown by FIG. 1, the end of a flexible tube 38 is secured to each of several of the apertures 36, while other apertures 36 are closed off by means of plugs 40, as shown by FIGS. 1 and 8, the purpose for which will be hereinafter explained. The tubes 38 are shown broken off, but are intended to be of such length as to reach the soil areas intended to be watered.

The upper tank 24 has, secured to its base 42, a support member 44 on which is mounted a pivotal evaporation chamber 46, by means of an arm 48 which is secured to the support member 44 by means of a rivet 50 acting as a pivot point. To each side of the support member 44 and arm 48 (only one is shown in FIGS. 3 and 4) there is mounted a coil spring 52, securing them to each other by the respective studs 52a and 52b, the spring 52 being so tensioned as to pivot the evaporator chamber 46 to the position shown by FIG. 3, as will be hereinafter explained.

The base 54 of the evaporator chamber 46, near the end furthest from the arm 48, is provided with a threaded aperture 56, through which is threaded a screw valve 58 adapted to be flush with the inner surface of the chamber 46, as shown in FIG. 5, or raised, by rotation of the screw valve 58, to rise above the said inner surface. The valve 58 is provided with intermediate openings 60 to permit water from the chamber 46 to pass therefrom into the upper tank 24, and a threaded screw 62, by the rotation of which the valve 58 is opened and closed.

Intermediate the valve 58 and the pivot arm 48, one end of a pair of arms 64 and 66 is secured to the undersurface of the chamber 46, the arms 64 and 66 being secured together by means of a rivet 68 acting as a pivot therefore. The arm 66 extends from this juncture in the shape of a stirrup, and is provided with a central opening (not shown) in its base 70. A rubber stopper 72 is secured to a stem 74 disposed through the opening in the base 70 and loosely locked therein by means of a nut (not shown), whereby the stem 74 is permitted a small amount of vertical play with respect to the arm 66. The stopper 72 is disposed directly over an opening 76 in the base of the upper tank 24, as shown in FIGS. 3 and 4, and is maintained in such registry by a latticed guide ring 78 secured to the base of the tank 24 and to the support member 44, as shown.

A water absorbing element, such as a sponge 80, is disposed within the evaporator chamber 46, occupying that half of its area furthest from the pivot arm 48, directly over the aperture 56, and extending substantially out of the chamber 46, as shown by FIGS. 1 and 2.

Coming now to the water supply for the device 10, there is provided a water inlet line 82, connected to an available water source (not shown), which passes through a slot 84 in the housing 12, and enters into the upper tank 24, being secured to its side wall by a coupling 86. Within the tank 24 the water line 82 is provided with a second coupling 88, from which it branches into two arms 90 and 92, arm 90 opening into the evaporator chamber 46 and arm 92 opening directly into the tank 24. The coupling 86 is provided with a control valve 94 secured to the arm 96 of a float 98 disposed within the tank 24, the valve 94 being adjusted to close the inlet line 82 when the float 98 is raised to the position shown in FIG. 4, and to open the inlet line 82 when the float 98 is lowered to the position shown in FIG. 3, the closure of the valve 94 being gradual from the latter to the former. A threaded valve 100 is provided in the coupling 88 to adjust the amount of water passing through the branch arm 90.

As shown by FIG. 1, the sponge 80 is disposed to extend out of the housing 12 so as to present a substantial portion of its area and surface to atmospheric conditions. A fine mesh cover may be used to enclose the protruding portion of the sponge 80 and thereby protect it from dirt and foreign matter, while at the same time not affecting its efficacy.

In the operation of my invention, let us say, for example, that it is desired to water four potted plants in a greenhouse. The device 10 is suitably installed and connected up to a water source by its inlet line 82, and the terminal ends of the tubes 38 are inserted in the soil of the plants, one to each plant, and secured in that position by any one of many suitable means, such as clips, etc. The device 10 is then primed by having the water enter into the evaporator chamber 46 through the inlet arm 90 until the sponge 80 is completely saturated. Upon such saturation the additional weight of the sponge 80, resulting from the weight of the added water, causes the evaporator chamber 46 to pivot downward, overcoming the tension of the spring 52, so that the stopper 72 is forced against the opening 76 in the tank 24, thus preventing water coming into the tank 24 from passing therethrough into the lower tank 18. In the meantime the tank 24 continues to fill with water from the inlet arm 92 until the float 98 rises to a preselected height, such as is shown in FIG. 4, whereupon the valve 94 closes off the water supply coming from the inlet line 82. The device 10 is now primed for future use and the potted plants have an adequate water supply.

With the passage of time, the length depending in large measure upon the extent of moisture in the surrounding atmosphere, the water supply in the plants diminishes and, at the same time the water in the sponge 80 evaporates. When the sponge 80 has lost sufficient water through evaporation its reduced weight likewise diminishes to the point that the spring 52 is now strong enough to pivotally draw the evaporator chamber 46 upward from the tank 24, thereby raising the stopper 72 so that the water in the tank 24 will empty into the tank 18 through the opening 76, and from the tank 18 will pass through the tubes 38 into the plant pots. As the water empties from the tank 24 the float 98 is lowered to the floor of the tank 24, thereby opening the valve 94, whereupon water from the water source will again pass through the inlet line 82 and the branch arms 90 and 92, to refill the evaporator chamber 46, thereby again saturating the sponge 80, and to refill the tank 24, the water thus entering tank 24 continuing to pass therefrom through its opening 76 into tank 18 until the water-weighted sponge 80 once again pivots toward the tank 24, forcing the stopper 72 against the opening 76 and thereby sealing it. The water will then continue to enter into the tank 24, as well as the evaporator chamber 46, until the rising of the float causes the valve 94 to close the inlet line 82. The device 10 is now again ready for use when the plants again require watering, as will be indicated by the evaporation of the water from the sponge 80.

Attention is now directed to the valve 100 which, as is shown more clearly in FIG. 6, can be adjusted to control the amount of water passing through the inlet arm 90, and the valve 58 which can be raised to rise above the floor of the chamber 46 and, by means of the screw 62, can control the amount of water passing from the chamber 46 into the tank 24. The valve 94 can also be adjusted to control and regulate the amount of water to be contained in the tank 24, through control of the extent of rise of the float 98 from its bottom.

In the embodiment shown by way of illustration there are a plurality of openings 36 in the tank 18 for connection to tubes 38, some of the openings being shown closed by plugs 40. As is clearly apparent various modifications of my invention can be constructed so as to provide for any number of openings 36 to accommodate an equal number of tubes 38, and thereby water as many plants, the amount of water to be used in one operation controllable by the aforementioned adjustments in the designated valves described. Also, areas of different sizes can be watered by one device 10, that is to say that, with a larger plant or area, two or more tubes 38 can be directed into such plant or area, or tubes 38 of varying diameters can be employed to accommodate specific requirements.

Having described my invention, I claim:

1. An automatic watering device comprising a housing, a lower tank and an upper tank disposed within the housing, the lower tank provided with a plurality of openings in its side wall adjacent its base, with an outlet tube leading from each opening and extending out of the housing, the upper tank superposed over the lower tank and provided with a base opening, an evaporator chamber, pivotal along one of its ends, disposed over and above the upper tank, water-absorbing material disposed within the chamber opposite its pivotal end, extending therefrom and exposed to the atmosphere, an opening in the base of the chamber below the water-absorbing material, a valve disposed in said chamber base opening,
a stopper secured to the undersurface of the chamber, the stopper adapted to come in registry with the opening in the upper tank upon the downward pivoting of the free side of the chamber by the saturation of the water-absorbing material,
spring means to pivot the free side of the chamber upward from the upper tank upon dehydration of the water-absorbing material to disengage the stopper from the opening in the upper tank,
a water-inlet line provided with
a first branch, opening into the chamber, and
a second branch, opening into the upper tank,
valve means to regulate the flow of water into the chamber from the first branch, and
valve means to control the flow of water from the inlet line.

2. An automatic watering device as described in claim 1, the housing further provided with a cover having an aperture adapted to permit the water-absorbing material to extend out of the housing cover therethrough.

3. An automatic watering device as described in claim 2, the water-absorbing material comprising a sponge.

4. An automatic watering device as described in claim 3, a latticed guide ring mounted upon the base of the upper tank around the opening therein, the guide ring enclosing the stopper secured to the undersurface of the chamber and adapted to permit vertical movement of the stopper therein.

5. An automatic watering device as described in claim 4, the valve disposed in the chamber base opening being threaded therethrough and adapted to be raised above the floor of the chamber.

6. An automatic watering device as described in claim 5, the valve means to control the flow of water through the inlet line including a float disposed in the upper tank and provided with a float arm secured to a control valve disposed within the inlet line, the lowering and raising of the float adapted to open and close off the inlet line.

7. An automatic watering device as described in claim 3, a mesh enclosure provided for the sponge area extending out of the housing.

References Cited

UNITED STATES PATENTS

| | | | |
|---|---|---|---|
| 2,577,337 | 12/1951 | Lancaster | 137—78 XR |
| 2,878,824 | 3/1959 | Swanson | 137—78 |
| 2,965,117 | 12/1960 | Gallacher | 137—78 |
| 3,108,400 | 10/1963 | Wolfe | 47—38 XR |
| 3,272,225 | 9/1966 | Frampton | 239—65 XR |
| 3,339,842 | 9/1967 | Hoeppel | 137—78 XR |

WILLIAM F. O'DEA, *Primary Examiner.*

RICHARD GERARD, *Assistant Examiner.*

U.S. Cl. X.R.

47—38; 137—391, 408, 575